(12) United States Patent
Ahrnkiel et al.

(10) Patent No.: US 7,090,442 B2
(45) Date of Patent: Aug. 15, 2006

(54) SHAPER ROUTER AND METHOD

(75) Inventors: Roger E. Ahrnkiel, Maple Valley, WA (US); Bradley A. Pense, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 10/731,770

(22) Filed: Dec. 9, 2003

(65) Prior Publication Data

US 2005/0123363 A1 Jun. 9, 2005

(51) Int. Cl.
*B23C 5/10* (2006.01)
(52) U.S. Cl. ............... 407/29.12; 407/29.13; 407/55; 407/59
(58) Field of Classification Search .......... 407/53, 407/54, 30, 29.13, 55, 29.12, 58, 59, 61–63; 408/230; B23C 5/10
See application file for complete search history.

(56) References Cited

U.S. PATENT DOCUMENTS

| 62,123 | A | * | 2/1867 | Elgin | 407/62 |
|---|---|---|---|---|---|
| 2,855,657 | A | | 10/1958 | Erhardt | |
| 2,923,053 | A | * | 2/1960 | Babbitt | 407/53 |
| 3,058,199 | A | | 10/1962 | Cave et al. | |
| 4,174,915 | A | | 11/1979 | Peetz et al. | |
| 4,395,167 | A | | 7/1983 | Maternus | |
| 4,480,949 | A | | 11/1984 | Van De Bogart | |
| 4,572,714 | A | * | 2/1986 | Suzuki et al. | 408/230 |
| 4,990,035 | A | | 2/1991 | Scheuch et al. | |
| 5,143,490 | A | * | 9/1992 | Kopras | 408/26 |
| 6,234,725 | B1 | * | 5/2001 | Campian | 407/54 |
| 2005/0105973 | A1 | * | 5/2005 | MacArthur | 407/53 |

* cited by examiner

*Primary Examiner*—Boyer D. Ashley
*Assistant Examiner*—Sara Addisu
(74) *Attorney, Agent, or Firm*—Alston & Bird LLP

(57) ABSTRACT

A routing tool for cutting material and an associated apparatus and method are provided. The tool includes a substantially cylindrical shaft member having a shank portion and a cutting portion. The cutting portion includes a plurality of cutting teeth disposed peripherally about a first helix and an intersecting second helix. Each cutting tooth defines a first cutting clearance on a first cutting edge and a first clearance on a first non-cutting edge. The cutting tooth defines a second cutting clearance on a second cutting edge and a second clearance on a second non-cutting edge. A flat extends on each cutting tooth resulting in a circular land on an outside diameter of the cutting portion.

26 Claims, 7 Drawing Sheets

SHAPER ROUTER AND METHOD

BACKGROUND OF THE INVENTION

1) Field of the Invention

The present invention relates to routing and, more specifically, to a tool and method for cutting and shaping materials using a router.

2) Description of Related Art

Routing is a process used to trim or cut various metal, plastic, and ceramic materials. Routers can also be used to cut composite laminated materials such as graphite. Composite laminated materials are commonly used in the airline and automotive industries due to its high strength to weight ratio, as well as its versatility to accommodate a variety of technical needs. Stiffer materials such as graphite or boron are typically embedded as fibers within a metallic or non-metallic sheet. Alternatively, sheets of stiffer materials can be laminated to metallic or nonmetallic sheets. An example of a typical composite material is fiberglass. Because of the composite material's high strength, the router must be designed to withstand high resistance and friction when cutting. Thus, the router must be fabricated with a strong metal or carbide in order to withstand these high stresses, as well as to resist wear and dulling.

Routers are capable of cutting different shapes and patterns along an edge, trimming edges, or cutting patterns or holes in the composite material. Prior art cutters have included various features to cut composite materials, such as helical flutes having notches, grooves, or lands intended to help with improving surface finish or chip removal. The flutes may be varied in number and orientation, as well as flute geometry. Two types of routers normally used to cut composite materials are diamond plated rotary files and carbide rotary diamond point ground rasps (i.e. herringbone ground cutters).

One example of a tool used to cut composite materials is U.S. Pat. No. 4,990,035 to Scheuch et al. (" '035 patent"). The '035 patent discloses a herringbone milling tool 1 having a clamping shank 2 and a cutting part 3, wherein there are staggered teeth extending about a helix. The staggered teeth are generally described as having a substantially pyramidal shape. The cutting part 3 defines cutting edges 5 and divider grooves 7, wherein the divider grooves extend at an opposite angle $\alpha_2$ to an angle $\alpha_1$ defining the cutting edges. "The divider grooves 7 form a secondary cutting edge 8 which, however, does not act as an actual cutting edge" (col. 4, lines 20–22). The '035 patent describes the milling cutter as capable of cutting integrated circuit boards, such as those that are reinforced with glass-fiber.

Another example of a cutting tool is U.S. Pat. No. 2,855,657 to Erhardt ("'657 patent"). The '657 patent has cutting teeth 2 arranged about a single helix. Notches 5 are disposed between the cutting teeth and serve as chip breakers. Chip breakers are not actually used to cut the workpiece, but are used to break up the chips as the cutting edges on the cutting teeth 2 are advanced through the workpiece.

Despite these features, additional innovations in cutting tooth geometry for cutting tools such as routers are desired to promote better surface finish in composite materials. Typical carbide or high-speed steels tools do not produce a desirable surface finish due to the heat generated and the abrasive nature of the graphite. Thus, the router must be able to cut and evacuate chips rapidly in order to avoid excessive heat production, which ultimately leads to poor surface finish and chattering. Chattering refers to the router flutes vibrating in a direction opposite to the direction being cut. Carbide and steel cutters dull easily, which produces excessive heat. Heat generation also leads to delamination of the material being cut. Delamination refers to separation of the layers of composite material and leads to a poor edge finish, which ultimately needs hand sanding to eliminate the delamination. Similarly, diamond coated tools do not produce an acceptable surface finish on the part, and hand sanding is usually required to clean up the parts. Also, diamond pointed tools usually have sharp points that wear out quickly and chip off easily.

It would therefore be advantageous to provide a router with an improved cutting tooth geometry that is capable of effectively cutting composite material. In addition, it would be advantageous to provide a router that produces minimal delamination and chattering. Finally, it would be advantageous to provide a router having cutting teeth that do not chip or dull easily.

SUMMARY OF THE INVENTION

The present invention provides an improved routing tool for cutting various materials and an associated apparatus and method. The tool includes a substantially cylindrical shaft member having a shank portion and a cutting portion. The cutting portion includes a plurality of cutting teeth disposed peripherally about both a first helix and an intersecting second helix. Each cutting tooth includes first and second cutting edges that are capable of cutting composite material, and first and second non-cutting edges that allow clearance for removal of chips. In particular each cutting tooth defines a first cutting clearance on the first cutting edge and a first non-cutting clearance on the first non-cutting edge. Each cutting tooth also defines a second cutting clearance on the second cutting edge and a second non-cutting clearance on the second non-cutting edge. Each cutting tooth further includes a flat resulting in a circular land on an outside diameter of the cutting portion.

According to one embodiment of the present invention, the first cutting and non-cutting edges are defined about the first helix, and the second cutting and non-cutting edges are defined about the second helix. Also, the cutting teeth of this embodiment are arranged so that there is a smooth transition between the first cutting edge of one cutting tooth and the first non-cutting edge of an adjacent cutting tooth. Similarly, there is a smooth transition between the second cutting edge of one cutting tooth and the second non-cutting edge of an adjacent cutting tooth. The first cutting and non-cutting edges extend radially outward to define a length of the flat, and the second cutting and non-cutting edges extend radially outward to define opposing edges of the flat.

In one, more specific embodiment, the flat on the cutting tooth is approximately 0.017 to 0.020 inches in length and has about a 0.001 inch land. The first helix may have an angle of about 30 degrees, and the second helix may have an angle of about −30 degrees relative to a reference plane extending perpendicular to a longitudinal axis of the shaft member. In addition, the first cutting clearance and first non-cutting clearance may be approximately 10 degrees, and the second cutting clearance and second non-cutting clearance may be approximately 10 to 12 degrees. The cutting clearances are angles drawn between the respective cutting edge and a plane drawn perpendicular to a longitudinal axis of the shaft member, while the non-cutting clearances are angles between a tangent to a relieved surface at the cutting edge and a plane drawn parallel to the longitudinal axis of the shaft member. The routing tool may comprise a grade H-10-F solid carbide. Also, the first helix may be right hand and include more teeth than the second helix, which may be left hand.

According to another embodiment, the present invention provides an apparatus for cutting various materials. The apparatus includes a router having a substantially cylindrical shaft member having a shank portion and a cutting portion. The cutting portion includes a plurality of cutting teeth disposed peripherally about a first helix and an intersecting second helix, wherein a cutting tooth defines a first cutting clearance on a first cutting edge and a first non-cutting clearance on a first non-cutting edge. The cutting tooth also defines a second cutting clearance on a second cutting edge and a second non-cutting clearance on a second non-cutting edge, as well as a flat extending resulting in a circular land on an outside diameter of the cutting portion. Finally, the apparatus includes a motor, wherein the motor is coupled to the shank portion to drive the cutting portion in rotation about an axis extending through the cylindrical shaft member.

The present invention also provides a method for forming a router tool. The method includes the step of forming a substantially cylindrical shaft member having a shank portion and a cutting portion by first grinding a plurality of first helixes into the cutting portion peripherally about the cutting portion. The grinding step forms a first cutting clearance on a first cutting edge and a first non-cutting clearance on a first non-cutting edge on a cutting tooth. In addition, the method includes grinding a plurality of second helixes into the cutting portion peripherally about the cutting portion to define a flat on each cutting tooth, resulting in a circular land on an outside diameter of the cutting portion. The second helixes intersect the first helixes such that the second grinding step forms a second cutting clearance on a second cutting edge and a second non-cutting clearance on a second non-cutting edge on the cutting tooth to define a plurality of cutting teeth.

The cutting tooth geometry provides for two cutting edges defined by right and left-hand helixes that provide for reduced delamination and improved surface finish when cutting composite material. Prior art herringbone routers generally provide for one cutting edge along a helix, while a second helix generally serves as a chip breaker and not as an actual cutting edge. Thus, the composite material would be more prone to delamination and would need to be hand sanded following cutting. Reducing the hand sanding step significantly decreases the production time when cutting composite material, and also reduces any scrapping of parts due to unacceptable surface finish. The present invention can thus produce a machined surface finish of about 125 root-mean-square average (RMS) or better, and does not produce any delamination.

The cutting tooth geometry also allows for improved chip evacuation to reduce the fiction and heat produced during cutting. The cutting tooth alignment produces a continuous line of cut when the tool is engaged with the part. Similarly, the overlapping cutting teeth and segments defined by the flats produce small chips, which allows for easier chip evacuation from the cutting teeth. Also, the smooth transition between the peaks of the cutting teeth and extending along the cutting edges, through the root, and up along the non-cutting edges aid in chip evacuation and reduce heat generation. Excessive heat causes increased delamination and chattering. In addition, no outside cooling agent need be used during cutting, so reducing heat production becomes even more important during the cutting process.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
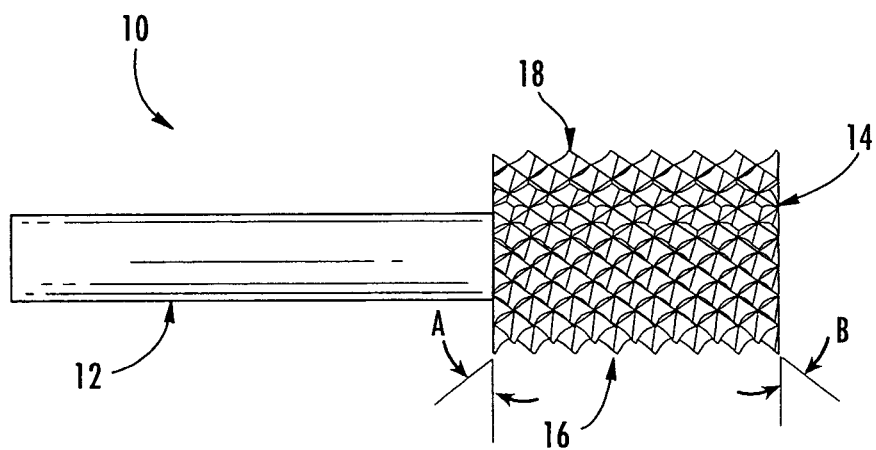
FIG. 1 is a side view illustrating a router configured to trim composite material according to one embodiment of the present invention.

Referring now to the drawings and, in particular, to FIG. 1, there is shown a router 10 according to one embodiment of the present invention. The term "router" is not meant to be limiting, and it is understood that the router 10 could by any rotary tool for cutting, trimming, shaping, or forming a variety of patterns, grooves, shapes or holes in a workpiece such as a laminated composite material. Thus, terms such as cutter, milling cutter, or the like could be used generically to describe the present invention.

The router 10 is used to cut many different types of material, such as metal or plastic. For example, the router 10 is used to cut composite material, such as laminated graphite, and the use of the router to cut composite material will be hereafter described by way of example, but not of limitation. Laminated graphite is most often used in the aerospace, underwater, and transportation industries because of its high strength to weight ratio. It is understood that the router 10 could also be used to cut any number of different composite materials, where the composite material comprises at least two different materials, such that its laminated structure is stronger than the individual materials alone. It is also understood that the composite material could be particle reinforced, fiber reinforced, or laminated sheets of material. Examples of laminated composite materials could be any artificially made combination of metal, polymer, or ceramic materials.

Figure 2:
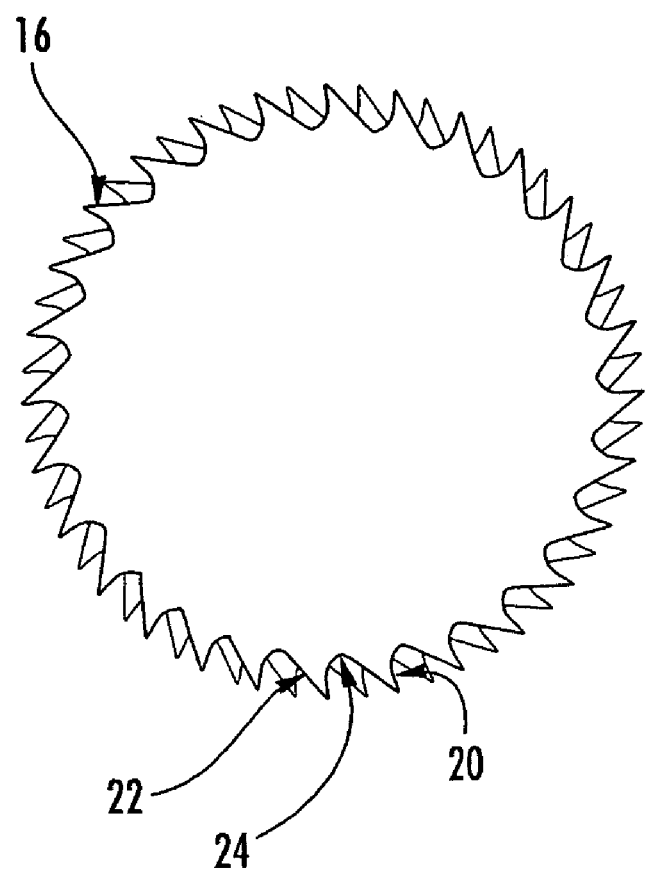
FIG. 2 is an end view illustrating the cutting teeth defined on the right-hand helix on the router of FIG. 1.

As shown in FIG. 1, the router 10 includes a shank portion 12 and a cutting portion 14. The shank portion 12 is generally smooth and cylindrical in shape, and is slightly smaller in diameter than the cutting portion 14. The cutting portion 14 includes cutting teeth 16 located peripherally about two helixes defined by angles A and B relative to a reference plane extending orthogonal to a longitudinal axis of the router 10. The cutting teeth 16 are generally defined as flutes along the cutting portion 14. FIG. 2 is an end view illustrating that a plurality of cutting teeth 16 are defined about the diameter of the cutting portion 24. The cutting teeth 16 extend in the same direction about the diameter of the cutting portion 14. That is, the teeth are angled in the same general direction. The geometry of the cutting teeth 16 will be explained more fully below.

The shank portion 12 of one embodiment has a diameter of about 0.5 inches and a length of about 1.875 inches. The cutting portion 14 is generally larger in diameter than the shank portion 12 and may, in one embodiment, have a diameter of about 0.875 inches and a length of about 1.125 inches. It is understood that a variety of dimensions could be used for the shank portion 12 to be sized for different motors or other driving methods, and a variety of dimensions could be used for the cutting to accommodate many different types and sizes of composite materials.

The router 10 is preferably made of a grade of carbide, such as grade H-10-F. This grade of carbide generally incorporates approximately 10% cobalt and 90% tungsten carbide. The grain size of this grade of carbide is approximately 0.8 µm. This material improves the longevity of the router 10, as well as the quality of the composite material cut as it is most suitable for tooling requiring toughness and sharp edges. The carbide material is able to reduce stress concentrations created by small radii, in addition to withstanding dry machining. It is understood that the router 10 could be formed of many different types of materials and grades of carbides. For example, a hard metal or a similar grade of carbide to H-10-F could be used to cut harder materials.

The cutting teeth 16 are arranged about right and left-hand helixes. As shown in FIG. 1, the right hand helix is defined by angle B, and the left hand helix is defined by angle A. The cutting teeth 16 are right-hand cut on both helixes such that the cutting teeth extend in the same direction about the cutting portion 14 along each helix. Preferably, angle A is −30 degrees and angle B is 30 degrees relative to a reference plane extending orthogonal to a longitudinal axis of the router 10. The cutting portion 14 may have different numbers of teeth with the right and left-hand helixes generally having different numbers of teeth. In one embodiment, the cutting portion 14 has 28 cutting teeth 16 along the right-hand helix and 24 cutting teeth the left-hand helix.

Having different numbers of cutting teeth on the right and left-hand helixes ensures that the cutting teeth 16 are overlapping during cutting and also forms a flat 18 between the teeth. Thus, no single cutting tooth 16 bears the entire load during cutting, so that many cutting teeth are overlapping to distribute the load on the cutting portion 14 on the router 10. The cutting tooth alignment produces a continuous line of cut when the tool is engaged with the part. This alignment also produces smaller chips that aid in keeping the cutting teeth 16 clear so that friction and heat generation is minimized during cutting. Minimizing heat generation helps to reduce or eliminate delamination.

It is understood that any number and combination of helix angles, A and B, as well as any number of cutting teeth 16 could be incorporated to provide the router 10 with the desired cutting tooth orientation and cutting configuration. For example, the helix angles A, B and number of cutting teeth 16 could be modified to accommodate different composite materials and produce a variety of surface finishes. Thus, more cutting teeth 16 could be used to accommodate softer materials, or less cutting teeth could be used for a more aggressive cut. In addition, a steeper helix angle A, B could be incorporated to achieve more of a "pulling" effect on the workpiece for a rougher surface finish.

Figure 4:
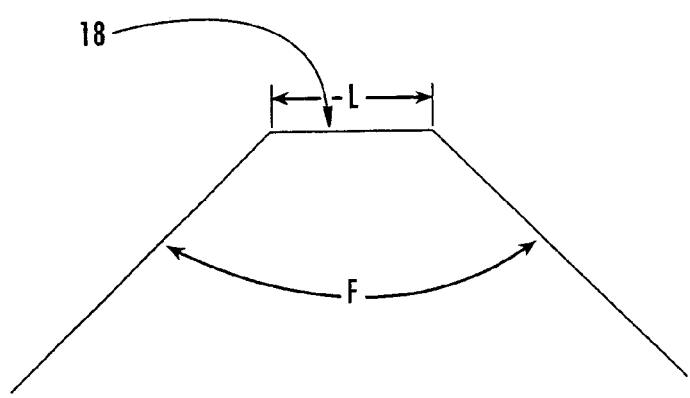
FIG. 4 is an enlarged section view illustrating the lands on the cutting teeth of the router shown in FIG. 1.

A flat 18 is defined along the peaks of the cutting teeth 16 such that there is a circular land on the outside diameter of the cutting portion 14, as shown in FIG. 4 which depicts a single cutting tooth. As FIG. 1 demonstrates, the circular land defines a continuous diameter about the cutting portion 14 along the flats 18 of the cutting teeth 16. The flat 18 essentially forms a segment between each cutting tooth 16, where it extends longitudinally along the right-hand helix. The flat 18 has a land along its edge so that each cutting tooth 20 does not have a sharp point at its peak. The land is generally about 0.001 inches wide along the flat 18, where the land extends into page shown in FIG. 4. The flat 18 may have a length within the range of approximately 0.017 to 0.020 inches, as shown in FIG. 4. The angle F on the flat 18 can be about 90 degrees.

The flat 18 and its corresponding land define a peak on the cutting teeth 16 that is not sharp. This reduces the potential for chipping sharp points off of the cutting teeth 16, as well as dulling the teeth prematurely. Excessive dulling would reduce the cutting capability of the cutting teeth 16, which produces a surface finish that is rough or has chatter marks. Dull cutting teeth 16 ultimately lead to increased friction and heat production, which increases delamination and poor surface finish. In addition, a dull cutting tooth 16 would also lead to increased burnishing wherein residual stresses are formed within the workpiece, which would ultimately lead to the potential for cracking in the finished workpiece. The flat 18 also acts as a circular land that has no points to slip between composite layers and cause delamination.

It is understood that many different dimensions and combinations of dimensions can be used with the flat 18 and its corresponding land, as well as the angle that forms the flat. For example, different helix angles A, B could be incorporated to produce a flat 18 and corresponding land having different dimensions to accommodate different materials being cut, so that the cutting teeth 16 could be used with many different composite materials to produce a desired cut and surface finish. For example, a longer flat 18 could be used to achieve a more aggressive cut for harder materials.

Figure 3:
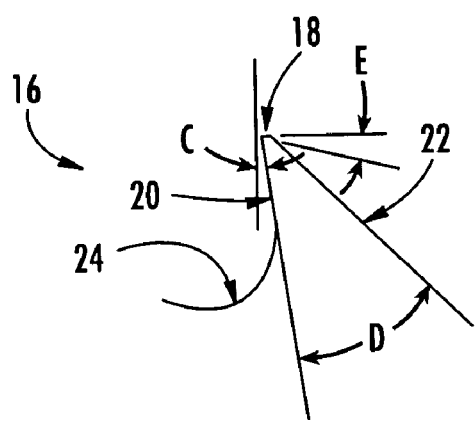
FIG. 3 is an enlarged section view illustrating a cutting tooth defined on the right-hand helix on the router of FIG. 1.

FIG. 3 illustrates an enlarged section view of one cutting tooth 16 defined along the right-hand helix. The cutting tooth 16 has a cutting edge 20, a non-cutting edge 22, and a root 24 at the base of the tooth. The cutting edge 20 has a planar surface near the peak of the cutting tooth 16 but then extends radially to the root 24 of the tooth. The non-cutting edge 22 is generally planar and extends to the flat 18 to define the peak on the cutting tooth 16. There is a smooth transition between the flat 18 on the cutting tooth 16 and extending along the cutting edge 20, progressing through the root 24, and up along the non-cutting edge 22 of an adjacent cutting tooth. The smooth transition allows chips to evacuate out of the segments defined by the right and left-hand helixes as rapidly as possible. This in turn reduces heat generation, which eliminates or decreases delamination.

The cutting tooth 16 has both a radial rake clearance angle C and a primary clearance angle E. The radial rake angle C is drawn between the respective cutting edge and a plane drawn perpendicular to a longitudinal axis of the router 10 and provides a cutting edge 20 for the cutting tooth 16 because the clearance gives the material space to move into as the cutting edge 20 is advanced through the composite material. Similarly, the primary clearance angle E is the angle between a tangent to a relieved surface at the cutting edge 20 and a plane drawn parallel to a longitudinal axis of the router 10 and gives chips space to move into as the material is cut. The radial rake and primary clearance angles C, E allow the cutting teeth 16 to cut composite material as rapidly as possible without producing excessive heat. The radial rake and primary clearance angles C, E may include any range of acceptable angles. For example, the radial rake and primary clearance angles C, E could be about 10 degrees. The angle D of each right-hand cut tooth could be about 36 degrees.

Figure 5:
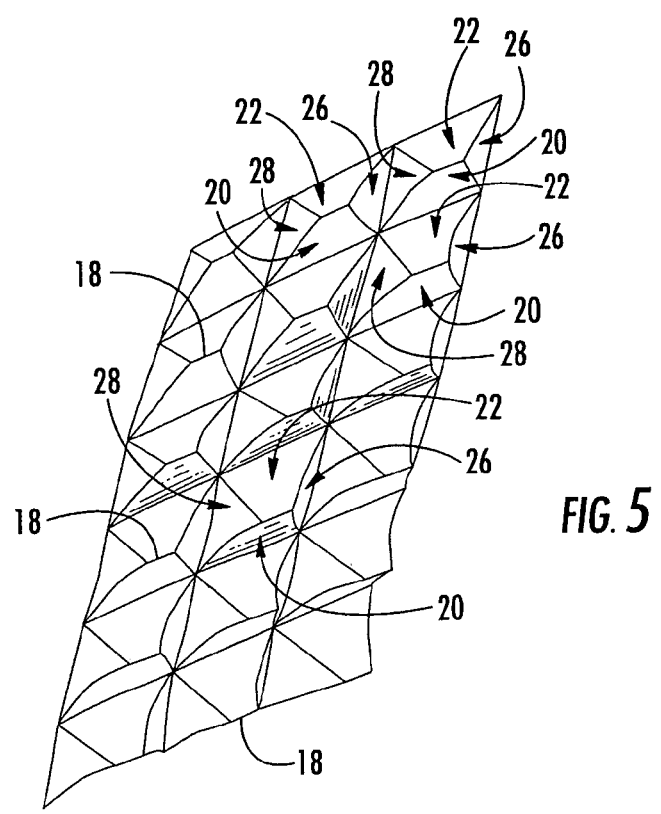
FIG. 5 is an enlarged perspective view of adjacent cutting teeth illustrating the cutting and non-cutting edges on the right and left-hand helixes.

FIG. 5 illustrates a perspective view of the cutting teeth 16 so that the cutting edge 26 and non-cutting edge 28 of the left-hand helix are shown. FIG. 5 demonstrates that the cutting teeth 16 are generally pyramidal and four-sided. Thus, the cutting teeth 16 have two cutting edges 20, 26 and two non-cutting edges 22, 28. The cutting edge 20 and the non-cutting edge 22 on the right-hand helix define the land extending along the length of the flat 18 of the cutting tooth 16. On the other hand, the cutting edge 26 and non-cutting edge 28 on the left-hand helix define the opposing edges of the flat 18. Two cutting edges 20, 26 provides the tooth geometry that is capable of producing an edge on the finished workpiece having an acceptable surface finish and no delamination when cutting a composite material such as graphite.

There is also a smooth transition from the peak on the cutting tooth 16 and extending along the cutting edge 26, progressing through the root 24, and up along the non-cutting edge 28 of an adjacent cutting tooth. The cutting edge 26 defined along the left-hand helix also has a radial rake angle G (not shown) drawn between the respective cutting edge and a plane drawn perpendicular to a longitudinal axis of the router 10, and the non-cutting edge 28 has a primary clearance angle H (not shown), which is the angle between a tangent to a relieved surface at the cutting edge 26 and a plane drawn parallel to the longitudinal axis of the router 10. The radial rake angle G and the primary clearance angle H could be in the range of about 10–12 degrees. As mentioned previously, the smooth transition between the cutting edge 26 and non-cutting edge 28 provides better chip evacuation and reduced heat production.

It is understood that many different combinations of cutting tooth angles and radial rake and primary clearance angles could be incorporated into the cutting teeth 16 along the right and left-hand helixes. Thus, a steeper tooth angle D could be used to decrease the radial rake angle C or to increase the primary clearance angle E. Similarly, the radial rake angle G and primary clearance angle H could be modified to accommodate different composite materials, or to achieve different surface finishes or cutting speeds. For example, a smaller radial rake angle C, G would cause more tearing in the workpiece to produce a rougher surface finish.

Figure 6:
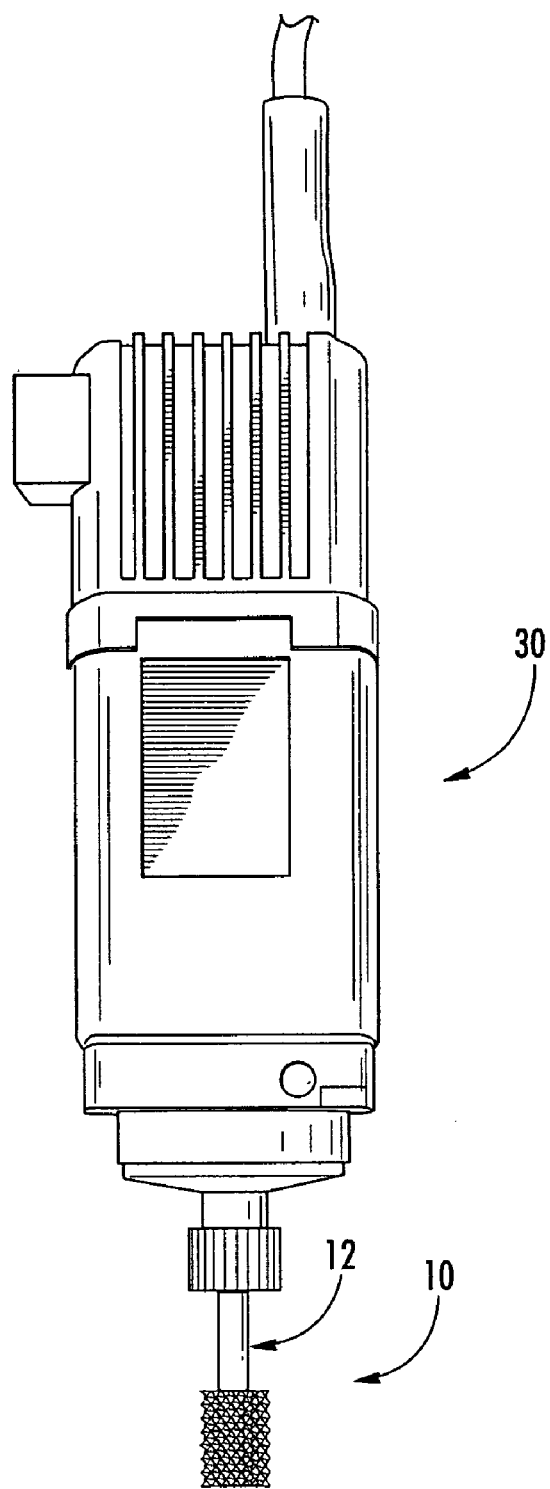
FIG. 6 is a side view illustrating a motor that drives the router of FIG. 1.

In another aspect of the present invention, an apparatus for driving a router 10 is disclosed, as shown in FIG. 6. In this embodiment a motor 30 or similar driving means is coupled to the shank portion 12 to drive the cutting portion 24 in rotation about a longitudinal axis extending through the shank and cutting portions. The motor 30 must be capable of driving the cutting portion 14 radially with sufficient angular velocity to allow the cutting teeth 16 to penetrate the composite material and to overcome the friction exerted on the cutting teeth. Routers are typically rotated at very high speeds, so the motor 30 must be capable of producing sufficient horsepower to withstand the friction between the router and the workpiece, as well as to keep a consistent and acceptable router speed while cutting. The router 10 could be used in conjunction with a manual hand-held type motor 30 as shown in FIG. 6, or the router could be mounted to a bench and used with a manual or an automated system to achieve the desired cuts.

Figure 7:
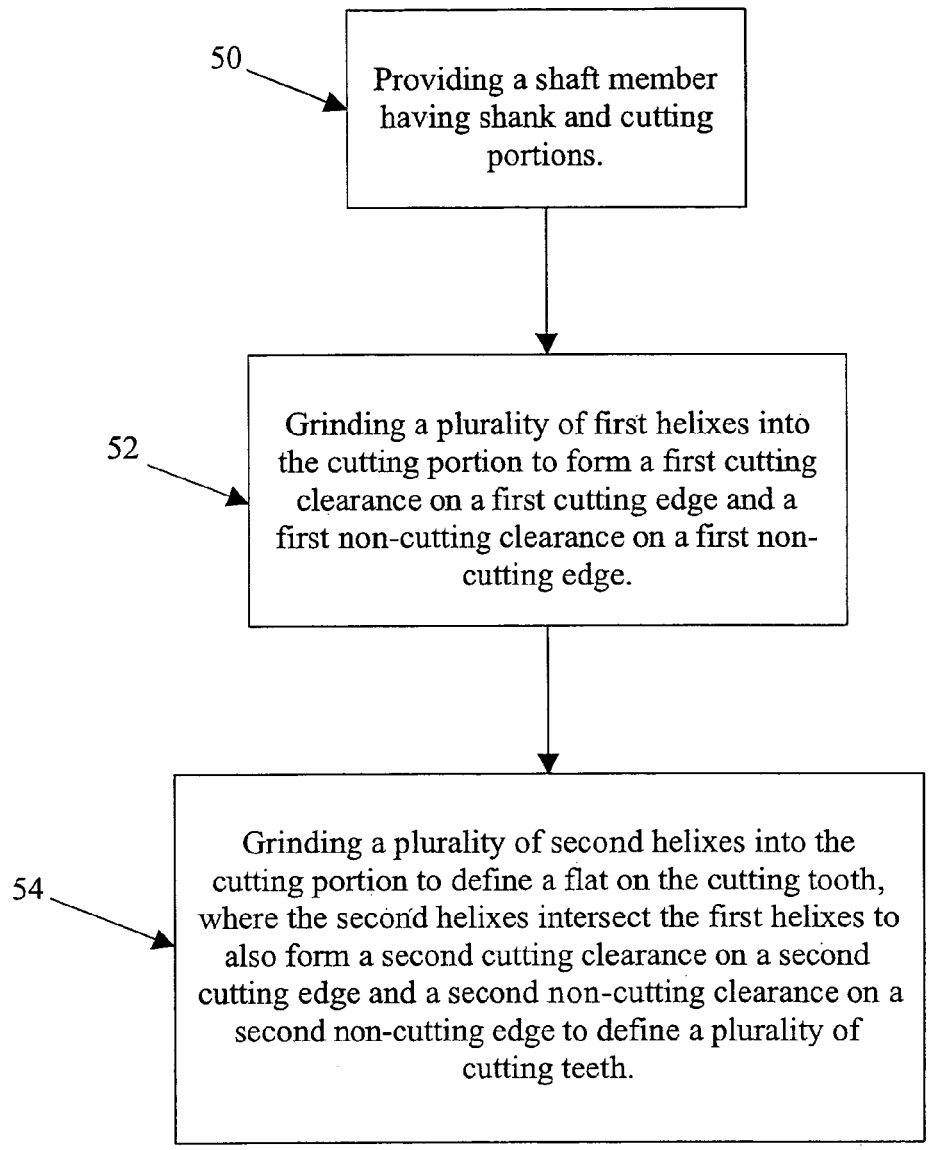
FIG. 7 is a flowchart illustrating a method of manufacturing the router shown in FIG. 1.

Once a shaft member is provided as shown in step 50, the router 10 may advantageously be machined using multiple grinding steps, as described in the flowchart shown in FIG. 7. The grinding steps incorporate a grinding wheel of approximately 40 degrees and a small radius when forming the right and left-hand helixes. The grinding steps can be formed manually by hand or programmed such that the grinding operations are formed automatically. Machining the router 10 broadly comprises the steps of grinding on the cutting portion 14 a plurality of helixes about angle B and subsequently grinding a plurality of second helixes about angle A. Specifically, step 52 demonstrates that the right-hand helix is ground first to produce the tooth angle D to define the cutting edge 20 and non-cutting edge 22, as well as the corresponding radial rake and primary clearance angles C, E. A plurality of right-hand helixes are ground to define a plurality of rows of non-segmented flutes. The right-hand helixes that are initially ground have a circular land along their peaks.

A second grinding step shown in step 54 forms the four-sided generally pyramidal shape that defines the cutting teeth 16. Specifically, the second grinding step defines a second cutting edge 26 and a second non-cutting edge 28, as well as a radial rake clearance angle G and primary clearance angle H. In addition, the second grinding step defines the flats 18 extending along the peak of the cutting teeth 16.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A routing tool for cutting material, the tool comprising: a substantially cylindrical shaft member having a shank portion and a cutting portion, the cutting portion including a plurality of cutting teeth disposed peripherally about a first helix and an intersecting second helix, wherein each cutting tooth defines a first cutting clearance on a first cutting edge and a first non-cutting clearance on a first non-cutting edge, wherein each cutting tooth further defines a second cutting clearance on a second cutting edge and a second non-cutting clearance on a second non-cutting edge, and wherein each cutting tooth includes a respective flat defined by each of the first cutting and non-cutting edges and the second cutting and non-cutting edges, each flat extending along each cutting tooth resulting in a circular land on an outside diameter of the cutting portion.

2. A routing tool according to claim 1, wherein the first cutting and non-cutting edges are defined about the first helix, and the second cutting and non-cutting edges are defined about the second helix.

3. A routing tocl according to claim 1, wherein the adjacent cutting teeth are configured to provide a smooth transition between the first cutting edge of one cutting tooth and the first non-cutting edge of an adjacent cutting tooth.

4. A routing tool according to claim 1, wherein the adjacent cutting teeth are configured to provide a smooth transition between the second cutting edge on one cutting tooth and the second non-cutting edge of an adjacent cutting tooth.

5. A routing tool according to claim 1, wherein the first cutting and non-cutting edges extend radially outward to define a length of the flat, and the second cutting and non-cutting edges extend radially outward to define opposing edges of the flat.

6. A routing tool according to claim 5, wherein the flat on the cutting tooth is approximately 0.017 to 0.020 inches in length.

7. A routing tool according to claim 1, wherein the first helix has an angle of about 30 degrees, and the second helix has an angle of about 30 degrees, wherein the helix angles are relative to a reference plane extending perpendicular to a longitudinal axis of the shaft member.

8. A routing tool according to claim 1, wherein the first cutting clearance is approximately 10 degrees and the second cutting clearance is approximately 10 to 12 degrees, wherein the first and second cutting clearances are drawn between the respeciive cutting edge and a plane drawn perpendicular to a longitudinal axis of the shal member.

9. A routing tool according to claim 1, wherein the first non-cutting clearance is approximately 10 degrees and the second non-cutting clearance is approximately 10 to 12 degrees, wherein the first and second non-cutting clearances are angles between a tangent to a relieved, surface at the cutting edge and a plane drawn parallel to a longitudinal axis of the shaft member.

10. A routing tool according to claim 1, wherein the routing tool comprises a grade H-10-F solid carbide.

11. A routing tool according to claim 1, wherein the cutting portion has more teeth along the first helix than the second helix.

12. A routing tool according to claim 1, wherein the cutting tooth has about a 0.001 inch land along the flat.

13. An apparatus for cutting material, the tool comprising:
   a router having a substantially cylindrical shaft member having a shank portion and a cutting portion, the cutting portion including a plurality of cutting teeth disposed peripherally about a first helix and an intersecting second helix, wherein each cutting tooth defines a first cutting clearance on a first cutting edge and a first non-cutting clearance on a first non-cutting edge, wherein each cutting tooth further defines a second cutting clearance on a second cutting edge and a second non-cutting clearance on a second non-cutting edge, and wherein each cutting tooth includes a respective flat defined by each of the first cutting and non-cutting edges and the second cutting and non-cutting edges, each flat extending along each cutting tooth resulting in a circular land on an outside diameter of the cutting portion; and
   a motor, wherein the motor is coupled to the shank portion to drive the cutting portion in rotation about an axis extending through the cylindrical shaft member.

14. A routing tool according to claim 13, wherein the first cutting and non-cutting edges are defined about the first helix, and the second cutting and non-cutting edges are defined about the second helix.

15. An apparatus according to claim 13, wherein the adjacent cutting teeth are configured to provide a smooth transition between the first cutting edge of one cutting tooth and the first non-cutting edge of an adjacent cutting tooth.

16. An apparatus according to claim 13, wherein the adjacent cutting teeth are configured to provide a smooth transition between the second cutting edge on one cutting tooth and the second non-cutting edge of an adjacent cutting tooth.

17. An apparatus according to claim 13, wherein the first cutting and non-cutting edges extend radially outward to define a length of the flat, and the second cutting and non-cutting edges extend radially outward to define opposing edges of the flat.

18. An apparatus according to claim 17, wherein the flat on the cutting tooth is approximately 0.017 to 0.020 inches in length.

19. An apparatus according to claim 13, wherein the first helix has an angle of about 30 degrees, and the second helix has an angle of about −30 degrees, wherein the helix angles are relative to a reference plane extending perpendicular to a longitudinal axis of the router.

20. A routing tool according to claim 13, wherein the first cutting clearance is approximately 10 degrees and the second cutting clearance is approximately 10 to 12 degrees, wherein the first and second cutting clearances are drawn between the respective cutting edge and a plane drawn perpendicular to a longitudinal axis of the router.

21. A routing tool according to claim 13, wherein the first non-cutting clearance is approximately 10 degrees and the second non-cutting clearance is approximately 10 to 12 degrees, wherein the first and second non-cutting clearances are angles between a tangent to a relieved surface at the cutting edge and a plane drawn parallel to a longitudinal axis of the router.

22. An apparatus according to claim 13, wherein the routing tool comprises a grade H-10-F solid carbide.

23. An apparatus according to claim 13, wherein the cutting portion has more cutting teeth along the first helix than the second helix.

24. An apparatus according to claim 13, wherein the cutting tooth has about a 0.001 inch land along the flat.

25. A method for forming a router tool, the method comprising:
   providing a substantially cylindrical shaft member having a shank portion and a cutting portion;
   grinding a plurality of first helixes into the cutting portion peripherally about the cutting portion, wherein the grinding step forms a first cutting clearance on a first cutting edge and a first non-cutting clearance on a first non-cutting edge on a cutting tooth; and
   grinding a plurality of second helixes into the cutting portion peripherally about the cutting portion, wherein the second helixes intersect the first helixes such that the second grinding step forms a second cutting clearance on a second cutting edge and a second non-cutting clearance on a second non-cutting edge on the cutting tooth to define a plurality of cutting teeth, and wherein the second helixes intersect the first helixes to define a respective flat on each cutting tooth, each flat defined by respective first cutting and non-cutting edges and second cutting and non-cuttiag edges, resulting in a circular land on an outside diameter of the cutting portion.

26. The method according to claim 25, wherein the grinding steps include grinding more teeth along the right-hand helix than the left-hand helix.

* * * * *

UNITED STATES PATENT AND TRADEMARK OFFICE
CERTIFICATE OF CORRECTION

PATENT NO. : 7,090,442 B2 Page 1 of 1
APPLICATION NO. : 10/731770
DATED : August 15, 2006
INVENTOR(S) : Ahrnkiel et al.

It is certified that error appears in the above-identified patent and that said Letters Patent is hereby corrected as shown below:

Column 3,
Line 55, "fiction" should read --friction--.

Column 9,
Line 1, "toci" should read --tool--;
Line 26, "respeciive" should read --respective--;
Line 27, "shal" should read --shaft--.

Column 10,
Line 60, "non-cuttiag" should read --non-cutting--.

Signed and Sealed this

Sixteenth Day of January, 2007

JON W. DUDAS
*Director of the United States Patent and Trademark Office*